United States Patent
Nichols et al.

(10) Patent No.: US 9,957,445 B2
(45) Date of Patent: *May 1, 2018

(54) RE-REFINING USED PETROLEUM BASED FLUIDS

(71) Applicant: AGC REFINING & FILTRATION, LLC, Springfield, MO (US)

(72) Inventors: Jerome Nichols, Ozark, MO (US); Tyler Humphreys, Willard, MO (US)

(73) Assignee: AGC REFINING & FILTRATION, LLC, Springfield, MO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/685,933

(22) Filed: Aug. 24, 2017

(65) Prior Publication Data

US 2017/0349842 A1    Dec. 7, 2017

Related U.S. Application Data

(62) Division of application No. 14/627,699, filed on Feb. 20, 2015.

(51) Int. Cl.

| | |
|---|---|
| *C10G 7/06* | (2006.01) |
| *C10G 7/00* | (2006.01) |
| *C10G 7/04* | (2006.01) |
| *C10G 55/04* | (2006.01) |
| *C10G 31/06* | (2006.01) |
| *C10G 33/00* | (2006.01) |

(52) U.S. Cl.
CPC ............. *C10G 7/003* (2013.01); *C10G 7/006* (2013.01); *C10G 7/04* (2013.01); *C10G 7/06* (2013.01); *C10G 31/06* (2013.01); *C10G 33/00* (2013.01); *C10G 55/04* (2013.01); *C10G 2300/1007* (2013.01)

(58) Field of Classification Search
CPC ........... C10G 7/003; C10G 7/006; C10G 7/06
See application file for complete search history.

(56) References Cited

U.S. PATENT DOCUMENTS

| 5,814,207 A | 9/1998 | Kenton |
| 2011/0278151 A1 | 11/2011 | MacDonald |

OTHER PUBLICATIONS

Bachelder, Dennis; Recycling Used Engine Oil by Re-refining, presented at California 2005 Used/Oil Household Hazardous Waste Conference, Apr. 28, 2005, 13 pages.

*Primary Examiner* — Renee Robinson
(74) *Attorney, Agent, or Firm* — Cozen O'Connor

(57) ABSTRACT

A method for separating a lubrication oil from a waste fluid includes separating water from the waste fluid by heating the waste fluid while sealed in a first vacuum chamber to a first temperature and first pressure. Fuel oil is separated from a fluid received from the first vacuum chamber by heating the fluid while sealed in a second vacuum chamber to a second temperature that is higher than the first temperature and at a second pressure. Finally, the lubrication oil is separated from a fluid received from the second vacuum chamber by heating the fluid received from the second vacuum chamber while sealed in a third vacuum chamber to a third temperature that is higher than the second temperature and at a third pressure.

15 Claims, 2 Drawing Sheets

RE-REFINING USED PETROLEUM BASED FLUIDS

CROSS REFERENCE TO RELATED APPLICATIONS

This application is a divisional of U.S. patent application Ser. No. 14/627,699 which was filed with the U.S. Patent and Trademark Office on Feb. 20, 2015.

BACKGROUND OF THE INVENTION

1. Field of the Invention

The present disclosure relates to re-refining petroleum or hydrocarbon based fluids.

2. Description of the Related Art

Used petroleum or hydrocarbon based fluids, such as lubrication oil, often become contaminated through use, for example, due to contamination from constituents that degrade, dilute, or otherwise negatively affect lubrication properties of lubrication oil. For example, used lubrication oil can include solid particles, water, hydrocarbon fuel components, lighter oils, dissolved metals, degraded additives, and other contamination components. Re-refining removes this contamination, making a base lubrication oil suitable for reuse in a lubrication application. Re-refining used lubrication oil conventionally includes superheating and thermally cracking the used lubrication oil. The process is complex and the equipment expensive.

SUMMARY OF THE INVENTION

In view of the discussion above, certain aspects encompass a method including separating water from a waste fluid that includes a lubrication oil by heating the waste fluid sealed in a first vacuum chamber to a first maximum specified temperature, separating fuel oil from a fluid received from the first vacuum chamber by heating the fluid received from the first vacuum chamber while sealed in a second vacuum chamber to a second maximum specified temperature that is higher than the first maximum specified temperature, and separating the lubrication oil from a fluid received from the second vacuum chamber by heating the fluid received from the second vacuum chamber while sealed in a third vacuum chamber to a third maximum specified temperature that is higher than the second maximum specified temperature.

Certain aspects encompass a system including a first vacuum chamber, a second vacuum chamber, and a third vacuum chamber. The first vacuum chamber includes a first sealed housing and a first vaporizer outlet, and is configured to separate water, through the first vaporizer outlet, from a waste fluid including a lubrication oil in response to heating the waste fluid sealed in the first vacuum chamber to a first maximum specified temperature. The second vacuum chamber includes a sealed housing and a second vaporizer outlet. The second vacuum chamber is configured to receive a fluid from the first vacuum chamber through a first fluid conduit connecting the first vacuum chamber and the second vacuum chamber, and configured to heat the fluid from the first vacuum chamber in the second vacuum chamber to a second maximum specified temperature higher than the first maximum specified temperature to separate fuel oil, through the second vaporizer outlet, from the fluid from the first vacuum chamber. The third vacuum chamber includes a sealed housing and a third vaporizer outlet. The third vacuum chamber is configured to receive a fluid from the second vacuum chamber through a second fluid conduit connecting the second vacuum chamber and the third vacuum chamber, and configured to heat the fluid from the second vacuum chamber in the third vacuum chamber to a third maximum specified temperature higher than the second maximum specified temperature to separate the lubrication oil, through the third vaporizer outlet, from the fluid from the second vacuum chamber.

Certain aspects encompass a method including (a) heating a fluid including waste fluid including lubrication oil in a vacuum to a maximum temperature less than a critical temperature of vaporization of the lubrication oil to separate a first component from the fluid, and (b) heating the remaining fluid from step (a) in a vacuum to a temperature above the critical temperature of vaporization of the lubrication oil, but not higher than the cracking temperature of the lubrication oil to separate the lubrication oil from the remaining fluid.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference symbols in the various drawings indicate like elements.

DETAILED DESCRIPTION OF THE PRESENTLY PREFERRED EMBODIMENTS

This disclosure encompasses a fluid treatment system for separating a base fluid from a waste fluid, for example, by implementing controlled pressure and temperature on the waste fluid in vacuum chambers. The system is applicable to a broad array of petroleum or hydrocarbon based fluids, including lubricating oil, fuel, glycol and others. The controlled temperature prevents thermal decomposition of the base fluid during the re-refining process.

Figure 1:
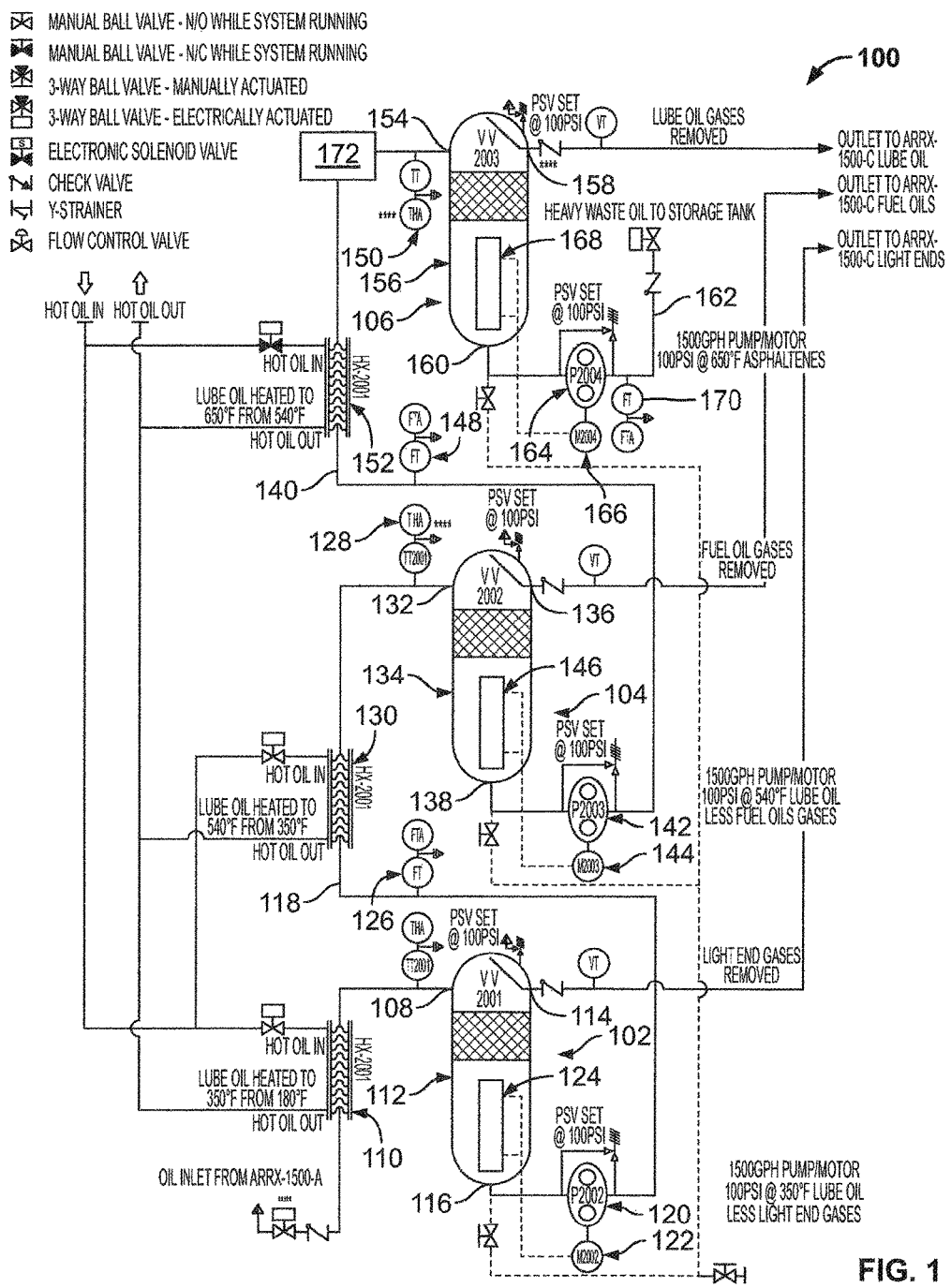
FIG. 1 is a schematic diagram of an example treatment system.

FIG. 1 is a schematic diagram of an example treatment system 100 for separating a base fluid from a waste fluid. The example system 100 includes three vaporizers or vacuum chambers: a first vacuum chamber 102, a second vacuum chamber 104, and a third vacuum chamber 106. Each of the vacuum chambers includes a sealed housing, a fluid inlet, a fluid outlet, and a vaporizer outlet. The sealed housings are pressure-sealed from an ambient environment to enable maintaining a specified pressure, in particular a vacuum, within the respective vacuum chamber.

In the example treatment system 100 of FIG. 1, each of the vacuum chambers functions to remove a different constituent made up of one or more components in the waste fluid by heating the fluid to a specified maximum temperature under specified pressure (vacuum) conditions to vaporize the constituent. Vaporization of the constituent allows the constituent to gather in an overhead portion of the vacuum chamber (e.g., as overhead distillate), where the constituents can be collected and outputted from the respective vacuum chamber through the vaporizer outlet.

In a waste fluid that includes a used lubrication oil, the constituents of the waste fluid can vary. For example, some constituents (e.g., contaminants) include thermal products (e.g., water, soot, carbon, fuel, and/or other), abrasive materials (e.g., road dust, silicates, wear metals like copper and aluminum, and/or other), chemical products (e.g., oxidation products, depleted additive remnants, and/or other), and/or other contaminants. Lubrication oil includes a base lubrication oil plus additives (e.g., detergent additives, antioxidant additives, anti-wear additives, pressure agents, friction modifiers, and/or other). The waste fluid includes a mixture of the base lubrication oil and additives, plus contaminants such as those mentioned above. Thus, as will be discussed in more detail below, the treatment system 100 receives the waste fluid and separates water and solids from the waste fluid in the first vacuum chamber 102. The remaining dehydrated waste fluid is fed into the second vacuum chamber 104 to remove lighter fractions, such as light fuel oil, diesel and kerosene. The non-distillable residue from the second vacuum chamber 104 is fed into the third vacuum chamber 106 and the remaining lube oil fraction is voltalized, controlling the temperature to mitigate cracking the oil. The resulting distillate includes constituents necessary for base oil, which is output from the example treatment system 100.

The example treatment system 100 processes the waste fluid in a batch process, where a batch of the waste fluid enters the first vacuum chamber 102 for processing in the first vacuum chamber 102, then moves to the second vacuum chamber 104 for processing in the second vacuum chamber 104, then moves to the third vacuum chamber 106 for processing in the third vacuum chamber 106. In some instances, the example treatment system 100 is configured to re-refine up to about 5700 liters (1500 gallons) of lubrication oil per hour.

Figure 2:
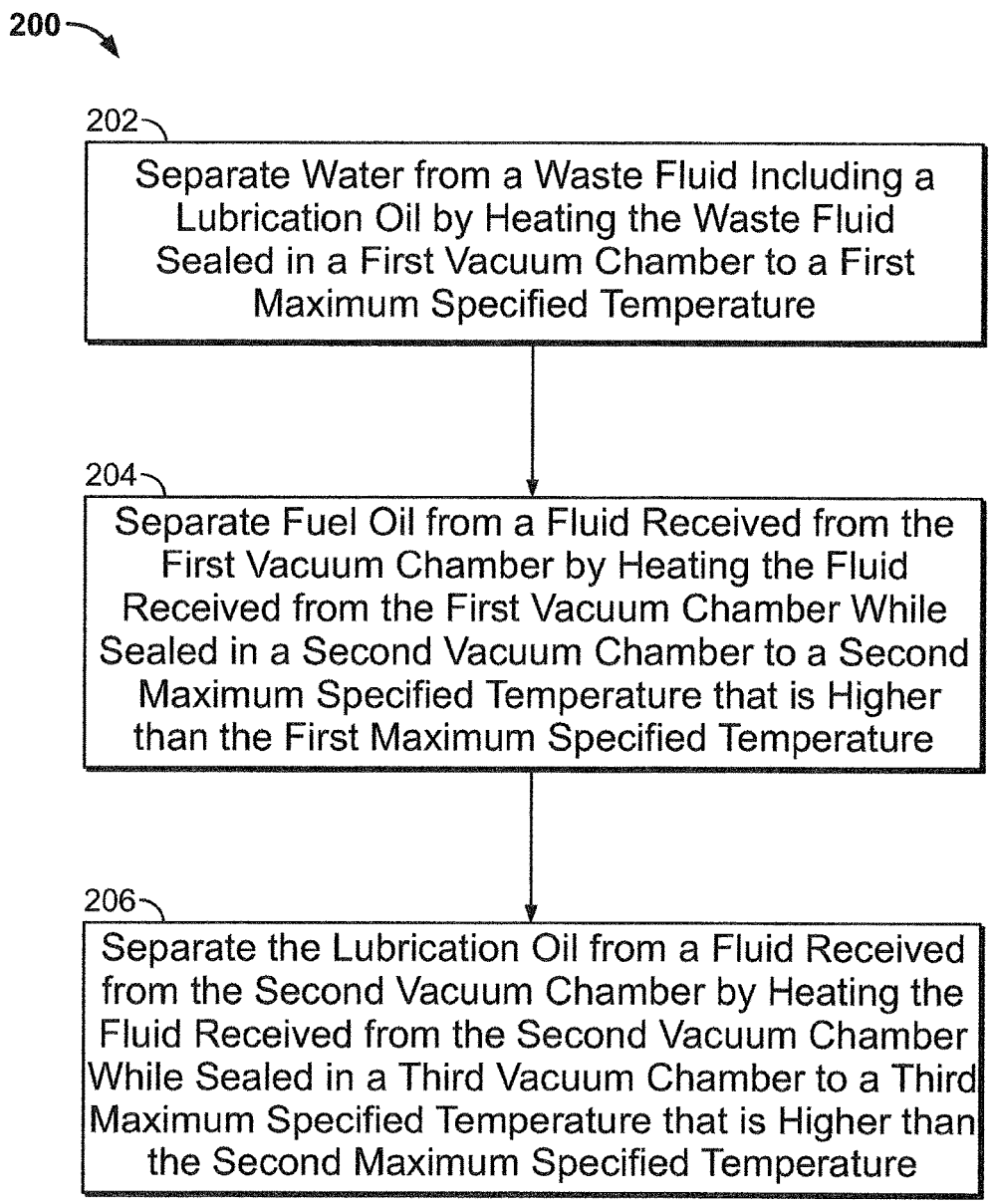
FIG. 2 is a flowchart of an example process for separating a base fluid from a waste fluid.

More specifically, referring to FIGS. 1 and 2, at 202, water is separated from a waste fluid including a lubrication oil by heating the waste fluid sealed in a first vacuum chamber to, but not over, a first maximum specified temperature while holding the waste fluid at a first specified pressure (e.g., a vacuum). In particular, a waste fluid including a used lubrication oil enters the first vacuum chamber 102 through the first fluid inlet 108. In some instances, the waste fluid passes through a heat exchanger 110 to increase a temperature of the waste fluid before entering the first vacuum chamber 102 through the first fluid inlet 108. The waste fluid is pressure-sealed within the first sealed housing 112 of the first vacuum chamber 102 by closing all inlet and outlet valves to and from the first vacuum chamber 102, such as the valves of the first fluid inlet 108, the first vaporizer outlet 114, and the first fluid outlet 116, and the pressure within the chamber 102 is adjusted to a first specified pressure. The first vacuum chamber 102 then processes the waste fluid, for example, by heating the waste fluid in the first vacuum chamber 102 to a first specified maximum temperature to separate a first constituent from the waste fluid. For example, the waste fluid is heated with a boiler and/or other heating element. Notably, however, the waste fluid is heated to, but not above, the specified maximum temperature.

Separation of the first constituent from the waste fluid can be achieved through vaporization of the first constituent. For example, the first specified maximum temperature for the first chamber 102 can be the critical vaporization temperature of water (e.g., evaporation temperature) at the first specified pressure, such that heating the waste fluid in the first chamber 102 to the first specified maximum temperature separates water and components lighter than water from the waste fluid. In certain instances, the waste fluid in the first chamber 102 is held at 78° (170° F.) under vacuum at 7.24 kPa absolute (1.05 psia). Alternately, by adjusting the specified maximum temperature and pressure, glycol can be separated in the first vacuum chamber 102, as well. The waste fluid is maintained in the first vacuum chamber 102 at the first specified maximum temperature and pressure for a specified dwell time, or dwell period, selected to ensure vaporization of the first constituent is complete. After vaporization of the first constituent, the valve of the first vaporizer outlet 114 is opened to release the vaporized constituent from the first vacuum chamber 102. The constituent exits the first vacuum chamber 102 through the first vaporizer outlet 114 at the top of the chamber 102 and collected, for example, in an output vessel. In instances where the first constituent includes water, the temperature and pressure in the first vacuum chamber 102 can be controlled to output primarily water. In certain instances, the output water can be irrigation quality, thus enabling easy disposal of the water and avoiding the need to transport the water to a hazardous waste disposal facility.

At 204, fuel oil is separated from a fluid received from the first vacuum chamber by heating the fluid received from the first vacuum chamber while sealed in a second vacuum chamber to a second maximum specified temperature that his higher than the first maximum specified temperature while holding the fluid at a second specified pressure (e.g., a vacuum). In particular, a fluid conduit 118 couples the first fluid outlet 116 of the first vacuum chamber 102 with the second fluid inlet 132 of the second vacuum chamber 104. A remainder of the waste fluid from the first vacuum chamber 102 (e.g., the remaining dehydrated waste fluid after removing water and components lighter than water from the waste fluid) is transferred from the first vacuum chamber 102 to the second vacuum chamber 104 through the fluid conduit 118. For example, a pump 120 (e.g., positive displacement pump and/or other), powered by a motor 122 (e.g., totally enclosed fan-cooled ("TEFC") motor and/or other), pumps the remainder of the waste fluid from the first vacuum chamber 102 through the fluid conduit 118 to the second vacuum chamber 104. The first vacuum chamber 102 includes a fluid level transmitter 124 connected to the motor 122 and configured to determine a level of fluid within the first vacuum chamber 102, for example, and shut off the motor 122 upon completing transfer of the remainder of the waste fluid from the first vacuum chamber 102 to the second vacuum chamber 104. The fluid conduit 118 includes a flow meter 126 and a temperature sensor 128. In some instances, the fluid conduit 118 passes through a heat exchanger 130 to increase the temperature of the remainder of the waste fluid as it transfers from the first vacuum chamber 102 to the second vacuum chamber 104.

The remainder of the waste fluid from the first vacuum chamber 102 is pressure-sealed within the second sealed housing 134 of the second vacuum chamber 104 by closing all inlet and outlet valves to and from the second vacuum chamber 104, such as the valves of the second fluid inlet 132, the second vaporizer outlet 136, and the second fluid outlet 138, and the pressure within the chamber 104 is adjusted to a second specified pressure. The second vacuum chamber 104 then processes the remaining waste fluid, for example, by heating the remaining waste fluid in the second vacuum chamber 104 to a second specified maximum temperature to remove a second constituent from the remainder of the waste fluid. In some examples, heating the remaining waste fluid in the second vacuum chamber 104 includes heating the second vacuum chamber 104 with a boiler and/or other heating element. Notably, however, the fluid in the second vacuum chamber 104 is heated to, but not above, the second specified maximum temperature.

Separation of the second constituent from the remaining waste fluid can be achieved through vaporization of the second constituent. For example, the second specified maximum temperature for the second chamber 104 can be the critical vaporization temperature of fuel oil (e.g., kerosene, light fuel oil, diesel, and/or other hydrocarbon fuel) at the second specified pressure, such that heating the remainder of the waste fluid in second chamber 104 to the second specified maximum temperature separates fuel oil and other components lighter than fuel oil from the fluid in the second vacuum chamber 104. In certain instances, the fluid in the second vacuum chamber 104 is held at 260° C. (170° F.) under vacuum at 7.24 kPa absolute (1.05 psia). The fluid is maintained in the second vacuum chamber 104 at the second specified maximum temperature and pressure for a specified dwell time selected to ensure vaporization of the second constituent is complete. After vaporization of the second constituent, the valve of the second vaporizer outlet 136 is opened to release the vaporized constituent from the second vacuum chamber 104. The constituent exits the second vacuum chamber 104 through the second vaporizer outlet 136 at the top of the chamber 104 and collected, for example, in an output vessel.

In instances where the second constituent includes fuel oil, the collected fuel oil can be used as fuel to power aspects of the example treatment system 100 or other external systems. For example, the example treatment system 100 can be self-powered or partially self-powered, such that the collected fuel oil powers the boilers, heaters, vacuum pumps, controllers, and/or other equipment of the system 100. In some examples, the treatment system 100 includes a generator to power electrical needs of the system 100, and the collected fuel oil powers (at least in part) the generator.

At 206, the oil is separated from a fluid received from the second vacuum chamber by heating the fluid received from the second vacuum chamber while sealed in a third vacuum chamber to a third maximum specified temperature that his higher than the second maximum specified temperature while holding the fluid at a third specified pressure (e.g., a vacuum). In particular, a second fluid conduit 140 couples the second fluid outlet 138 of the second vacuum chamber 104 with the third fluid inlet 154 of the third vacuum chamber 106. A remainder of the waste fluid from the second vacuum chamber 104 (e.g., the remaining, non-distillable waste fluid after removing fuel oil and components lighter than the fuel oil from the waste fluid) is transferred to the third vacuum chamber 106 through the second fluid conduit 140. For example, a second pump 142 (e.g., positive displacement pump and/or other), powered by a second motor 144 (e.g., TEFC motor and/or other), pumps the fluid from the second vacuum chamber 104 through the second fluid conduit 140 to the third vacuum chamber 106. The second vacuum chamber 104 includes a second fluid level transmitter 146 connected to the second motor 144 and configured to determine a level of fluid within the second vacuum chamber 104, for example, and stop the motor 144 upon completing transfer of the fluid from the second vacuum chamber 104 to the third vacuum chamber 106. The second fluid conduit 140 includes a flow meter 148 and a temperature sensor 150. In some instances, the second fluid conduit 140 passes through a heat exchanger 152, for example, to increase the temperature of the fluid as it transfers from the second vacuum chamber 104 to the third vacuum chamber 106.

The remainder of the waste fluid from the second vacuum chamber 104 is pressure-sealed within the third sealed housing 156 of the third vacuum chamber 106 by closing all inlet and outlet valves to and from the third vacuum chamber 106, such as the valves of the third fluid inlet 154, the third vaporizer outlet 158, and the third fluid outlet 160, and the pressure in the chamber 106 is adjusted to a third specified pressure. The third vacuum chamber 106 then processes the fluid, for example, by heating the fluid in the third vacuum chamber 106 to a third specified maximum temperature to volatilize and remove an oil suitable as component for base lubrication oil. In some examples, heating the remaining waste fluid in the third vacuum chamber 106 includes heating the third vacuum chamber 106 with a boiler and/or other heating element. As before, the fluid is heated to, but not above, the third specified maximum temperature.

Separation of the oil from the remaining waste fluid can be achieved through vaporization of the oil. For example, the third specified maximum temperature for the third vacuum chamber 106 can be the critical vaporization temperature of the oil, such that heating the fluid in the third vacuum chamber 106 to the third specified maximum temperature separates the oil from the remainder of the fluid in the third vacuum chamber 106. The temperature is low enough that cracking of the vaporized oil is prevented or mitigated so that only mild thermal cracking occurs. In certain instances, the fluid in the third chamber 106 is held at 371° C. (700° F.) under vacuum at 7.24 kPa absolute (1.05 psia). Alternatively, by adjusting the third maximum temperature and pressure, separation of petroleum-based oil from synthetic oil (such as synthetic oil based on higher boiling poly-a-olefin compositions) and/or separation of high-boiling polynuclear aromatic compounds produced during in service use of the oil can be separated and retained in the residue. The fluid is maintained in the third vacuum chamber 106 at the third specified maximum temperature and pressure for a specified dwell time selected to ensure vaporization of the oil is complete. If mild thermal cracking is desired, the temperature and dwell time is closely controlled to achieve the desired degree of thermal cracking Mildly thermal cracking the base oil cracks any constituents that are thermally sensitive and that will deteriorate during service into volatile products which can be removed. Additionally, any higher boiling point constituents that will deteriorate and form coke or coke precursors during service will be encouraged to form coke that can be removed by distillation of the base fluid (from the coke or coke precursors) or by filtration.

After vaporization of the oil, the valve of the third vaporizer outlet 158 is opened to release the vaporized oil from the third vacuum chamber 106. The oil exits the third vacuum chamber 106 through the third vaporizer outlet 158 at the top of the chamber 106 and collected, for example, in a base lubrication oil vessel. The oil produced from the third vacuum chamber 106 is a refined stable and clean product that can be used to reconstitute base lubrication oil. The remnants in the chamber 106 include non-distillable carbonaceous materials, wear metal, degraded additives, and oxidation products. These remnants may be useful for use as bitumen extender for road asphalt or for plant fuel, depending on environmental regulations.

In the example treatment system 100 of FIG. 1, a third fluid conduit 162 couples the third fluid outlet 160 of the third vacuum chamber 106 with a storage tank. The remainder of the waste fluid from the third chamber 106 exits the third vacuum chamber 106 at the third fluid outlet 160 through the third fluid conduit 162. For example, a third pump 164 (e.g., positive displacement pump and/or other), powered by a third motor 166 (e.g., TEFC motor and/or other), pumps the remainder of the waste fluid from the third vacuum chamber 106 through the third fluid conduit 162 to the storage tank. The third vacuum chamber 106 includes a third fluid level transmitter 168 connected to the third motor 166 and configured to determine a level of fluid within the third vacuum chamber 106, for example, during transfer of the remainder of the waste fluid from the third vacuum chamber 106 to the storage tank. The third fluid conduit 162 includes a flow meter 170. In some instances, the remainder of the waste fluid from the third chamber 106 includes a non-volatile residue including, for example, non-distillable carbonaceous materials, wear metals, degraded additives, and oxidation products produced during a service life of the used lubrication oil. In some instances, high-boiling polynuclear aromatic compounds are separated from the base lubrication oil and retained in the non-volatile residue. The non-volatile residue can be used, for example, as bitumen extender for road asphalt or as fuel.

In some instances, the treatment system 100 includes a fourth vacuum chamber and a base oil conduit coupling the third vaporizer outlet 158 to a fluid inlet of the fourth vacuum chamber to further treat the base lubrication oil from the third vacuum chamber 106. For example, the base lubrication oil from the third vacuum chamber 106 passes through the base oil conduit to the fourth vacuum chamber. The base lubrication oil is pressure-sealed within the fourth vacuum chamber by closing all inlet valves and outlet valves to and from the fourth vacuum chamber. The fourth vacuum chamber then treats the base lubrication oil by heating the base lubrication oil in the fourth vacuum chamber to viscbreak the base lubrication oil, for example, to decrease a viscosity of the base lubrication oil. In certain instances, viscbreaking the base lubrication oil in the additional vacuum chamber includes heating the base lubrication oil to a fourth maximum specified temperature that is higher than the third maximum specified temperature mentioned above. For example, the fourth maximum specified temperature can be at or between 370 and 455° Celsius (at or between 700 and 850° Fahrenheit). In some instances, heating the base lubrication oil to the fourth maximum specified temperature causes mild thermal cracking of the base lubrication oil, for example, to further treat the base lubrication oil into a more refined base lubrication oil.

In some instances, the treatment system 100 includes a reactor 172, for example, along the second fluid conduit 140 between the second vacuum chamber 104 and the third vacuum chamber 106 as depicted in FIG. 1, or along the base oil conduit between the third vacuum chamber 106 and an additional vacuum chamber (e.g., fourth vacuum chamber). The reactor 172 (e.g., guard reactor) includes inorganic compounds, such as calcium oxide (CaO), calcium hydroxide [Ca(OH)2], magnesium oxide (MgO), and/or magnesium hydroxide, [Mg(OH)2], to remove sulfur from a fluid within the reactor and/or remove fine unfilterable particles from the fluid. The reactor can receive and treat one of the base lubrication oil received from the third vacuum chamber 106 or the remainder of the waste fluid received from the second vacuum chamber 104.

The treatment system 100 can include additional or different features. For example, one or more of the vacuum chambers can include Raschig rings (i.e., a bed of tubing pieces within the vacuum chamber) to facilitate, and increase the efficiency of, the separation of the constituents from the waste fluid, temperature sensors to determine a fluid temperature within the vacuum chambers, additional check valves, ball valves, relief vales, solenoid valves, and/or other valves for control, redundant protection, system safety, or other function, sensors, and/or other features. In some instances, the treatment system 100 includes a boiler for each vacuum chamber to heat the fluid in each vacuum chamber to respective specified maximum temperatures. In certain instances, the separated fuel oil from the second vacuum chamber 104 can be used as fuel for the boilers of the treatment system 100, or for other internal or external equipment.

The specified maximum temperatures for each of the vacuum chambers can vary, for example, based on the specified constituent(s) to be removed from the waste fluid, the pressure in the respective vacuum chamber, the amount of dwell time the fluid is heated in the vacuum chambers, and/or other factors. In some instances, the first specified maximum temperature is just below the critical vaporization temperature of the fuel oil (e.g., critical vaporization temperature of kerosene), such that all components lighter than the fuel oil are separated from the waste fluid in the first vacuum chamber 102. For example, the first specified maximum temperature can be at or between 60 and 121° Celsius (at or between 140 and 250° Fahrenheit). In some instances, the second specified maximum temperature is just below the critical vaporization temperature of the base lubrication oil, such that all components lighter than the base lubrication oil are separated from the waste fluid remainder in the second vacuum chamber 104. For example, the second specified maximum temperature can be at or between 121 and 260° Celsius (at or between 250 and 500° Fahrenheit). In some instances, the third specified maximum temperature is above the critical vaporization temperature of the base lubrication oil, but not higher than the cracking temperature of the base lubrication oil, such that the base lubrication oil is separated from the waste fluid remainder in the third vacuum chamber 106. For example, the third specified maximum temperature can be at or between 260 and 400° Celsius (at or between 500 and 750° Fahrenheit). Notably, the first and second specified maximum temperatures can be below the third specified temperature to ensure that the base lubrication oil is not separated before the third stage.

The example treatment system 100 of FIG. 1 shows three vacuum chambers. However, a different number of vacuum chambers can be used. For example, a treatment system can include only one chamber, two chambers, or three or more chambers. In some implementations, the number of vacuum chambers is based on the number of constituents to be separated from the waste fluid inputted into the treatment system, where each vacuum chamber functions to separate one or more constituents from a fluid within the respective vacuum chamber. For example, the example treatment system 100 of FIG. 1 includes three vacuum chambers for separating water, fuel products, and the base lubrication oil, respectively. In an example treatment system with two vacuum chambers, the first vacuum chamber can be used separate all constituents that are lighter than a base lubrication oil from a waste fluid, such as solid constituents, water, fuel products like kerosene, and/or other constituents, and the second vacuum chamber can be used to separate a base lubrication oil from the remainder of the waste fluid. In some instances, an example treatment system includes only one vacuum chamber, where a waste fluid is heated to multiple specified maximum temperatures to separate (e.g., via vaporization) respective constituents from the waste fluid in stages, or batches. In some instances, using the first vacuum chamber 102, second vacuum chamber 104, or another vacuum chamber, glycol is separated from the waste fluid. Although a different number of vacuum chambers can be used in example treatment systems, the treatment systems process waste fluid in a batch process.

While the treatment system 100 has been described in an example of separating a base lubrication oil from a waste fluid, the system 100 can also be used in separating a broad array of other petroleum or hydrocarbon based fluids from a waste fluid. For example, the system 100 can be used to separate fuel, glycol or other fluid from a waste fluid, by setting the third maximum specified temperature to above the vaporization temperature of petroleum or hydrocarbon based fluid to be separated. Similarly, the specified maximum temperatures in the other vacuum chambers can be adjusted to remove other constituents by adjusting the first and second specified maximum temperatures.

A footprint of the example treatment system 100 can vary. In certain instances, the system 100 can be made to fit within sixty-feet square. In some instances, the footprint of the example treatment system 100 is within a surface area of one hundred square feet, ten feet by ten feet, and/or within a surface area of six feet by twelve feet, such that the example treatment system 100 is a mini re-refinery. In some examples, the footprint of the treatment system 100 allows for portability of the system 100, and/or various placement and implementations of the system 100. For example, the example system 100 can be placed directly at a location of a waste fluid feed. In some examples, the system 100 could be placed outside of a repair facility that performs oil changes, carried on a truck and driven around to collect waste fluid, temporarily located in the vicinity of multiple sources of waste fluid (e.g., in the vicinity of multiple repair facilities), and/or otherwise placed. The components of the example system 100 can be carried on a common skid (e.g., a six foot by twelve foot skid), or carried as separate modules.

In view of the discussion above, certain aspects encompass a method including separating water from a waste fluid that includes a lubrication oil by heating the waste fluid sealed in a first vacuum chamber to a first maximum specified temperature, separating fuel oil from a fluid received from the first vacuum chamber by heating the fluid received from the first vacuum chamber while sealed in a second vacuum chamber to a second maximum specified temperature that is higher than the first maximum specified temperature, and separating the lubrication oil from a fluid received from the second vacuum chamber by heating the fluid received from the second vacuum chamber while sealed in a third vacuum chamber to a third maximum specified temperature that is higher than the second maximum specified temperature.

Certain aspects encompass a system including a first vacuum chamber, a second vacuum chamber, and a third vacuum chamber. The first vacuum chamber includes a first sealed housing and a first vaporizer outlet, and is configured to separate water, through the first vaporizer outlet, from a waste fluid including a lubrication oil in response to heating the waste fluid sealed in the first vacuum chamber to a first maximum specified temperature. The second vacuum chamber includes a sealed housing and a second vaporizer outlet. The second vacuum chamber is configured to receive a fluid from the first vacuum chamber through a first fluid conduit connecting the first vacuum chamber and the second vacuum chamber, and configured to heat the fluid from the first vacuum chamber in the second vacuum chamber to a second maximum specified temperature higher than the first maximum specified temperature to separate fuel oil, through the second vaporizer outlet, from the fluid from the first vacuum chamber. The third vacuum chamber includes a sealed housing and a third vaporizer outlet. The third vacuum chamber is configured to receive a fluid from the second vacuum chamber through a second fluid conduit connecting the second vacuum chamber and the third vacuum chamber, and configured to heat the fluid from the second vacuum chamber in the third vacuum chamber to a third maximum specified temperature higher than the second maximum specified temperature to separate the lubrication oil, through the third vaporizer outlet, from the fluid from the second vacuum chamber.

Certain aspects encompass a method including (a) heating a fluid including waste fluid including lubrication oil in a vacuum to a maximum temperature less than a critical temperature of vaporization of the lubrication oil to separate a first component from the fluid, and (b) heating the remaining fluid from step (a) in a vacuum to a temperature above the critical temperature of vaporization of the lubrication oil, but not higher than the cracking temperature of the lubrication oil to separate the lubrication oil from the remaining fluid.

The aspects above can include some, none, or all of the following features. The first maximum specified temperature is below the critical vaporization temperature of the fuel oil at a pressure in the first vacuum chamber. The first maximum specified temperature is at or between 60 and 121° Celsius. The second maximum specified temperature is below the critical vaporization temperature of the lubrication oil at a pressure in the second vacuum chamber. The second maximum specified temperature is at or between 121 and 260° Celsius. The third maximum specified temperature is above the critical vaporization temperature of the lubrication oil at a pressure in the third vacuum chamber, but not higher than the cracking temperature of the lubrication oil at the pressure in the third vacuum chamber. The third maximum specified temperature is at or between 260 and 400° Celsius. Heating the waste fluid sealed in the first vacuum chamber includes maintaining a first pressure in the first vacuum chamber, heating the fluid received from the first vacuum chamber while sealed in the second vacuum chamber includes maintaining a second pressure in the second vacuum chamber, heating the fluid received from the second vacuum chamber while sealed in the third vacuum chamber includes maintaining a third pressure in the third vacuum chamber, and the first pressure, the second pressure, and the third pressure are each below atmospheric pressure. The first pressure, the second pressure, and the third pressure are each about 1.05 pounds per square inch (psi). Separating fuel oil from a fluid received from the first vacuum chamber includes separating kerosene from the fluid received from the first vacuum chamber. The method includes viscbreaking the lubrication oil received from the third vacuum chamber by heating the lubrication oil from the third vacuum chamber while sealed in a fourth vacuum chamber to a fourth maximum specified temperature that is higher than the third maximum specified temperature to decrease a viscosity of the lubrication oil. The fourth maximum specified temperature is at or between 370 and 455° Celsius. The method includes removing sulfur from one of the lubrication oil received from the third vacuum chamber or the fluid received from the second vacuum chamber in a reactor. The first vacuum chamber, second vacuum chamber, and third vacuum chamber each are selectively pressure-sealed from an ambient environment. The system includes a fourth vacuum chamber and a third fluid valve between the third vacuum chamber and the fourth vacuum chamber, where the fourth vacuum chamber is configured to viscbreak lubrication oil transported from the third vacuum chamber to the fourth vacuum chamber through the third vacuum valve. The system includes a reactor configured to remove sulfur from one of the lubrication oil from the third vacuum chamber, the fluid from the second vacuum chamber, or the fluid from the first vacuum chamber. A footprint of the system is within a surface area of sixty feet by sixty feet. A footprint of the system is within a surface area of 100 square feet. Heating a fluid including waste fluid including lubrication oil in a vacuum includes heating the fluid in a first pressure-sealed vessel, and heating the remaining fluid in a vacuum includes heating the remaining fluid in a second pressure-sealed vessel.

A number of embodiments have been described. Nevertheless, it will be understood that various modifications may be. Accordingly, other embodiments are within the scope of the following claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   separating water from a waste fluid comprising a lubrication oil by sealing the waste fluid in a first vacuum chamber by closing all inlet and outlet valves to and from the first vacuum chamber, and heating the waste fluid sealed in the first vacuum chamber to a first maximum specified temperature;
   separating fuel oil from a fluid received from the first vacuum chamber by sealing the fluid received from the first vacuum chamber in a second vacuum chamber by closing all inlet and outlet valves to and from the second vacuum chamber, and heating the fluid received from the first vacuum chamber while sealed in the second vacuum chamber to a second maximum specified temperature that is higher than the first maximum specified temperature; and
   separating the lubrication oil from a fluid received from the second vacuum chamber by sealing the fluid received from the second vacuum chamber in a third vacuum chamber by closing all inlet and outlet valves to and from the third vacuum chamber, and heating the fluid received from the second vacuum chamber while sealed in the third vacuum chamber to a third maximum specified temperature that is higher than the second maximum specified temperature.

2. The method of claim 1, where the first maximum specified temperature is below the critical vaporization temperature of the fuel oil at a pressure in the first vacuum chamber.

3. The method of claim 2, where the first maximum specified temperature is at or between 60 and 121° Celsius.

4. The method of claim 1, where the second maximum specified temperature is below the critical vaporization temperature of the lubrication oil at a pressure in the second vacuum chamber.

5. The method of claim 4, where the second maximum specified temperature is at or between 121 and 260° Celsius.

6. The method of claim 1, where the third maximum specified temperature is above the critical vaporization temperature of the lubrication oil at a pressure in the third vacuum chamber.

7. The method of claim 6, where the third maximum specified temperature is at or between 260 and 400° Celsius.

8. The method of claim 1, wherein heating the waste fluid sealed in the first vacuum chamber comprises maintaining a first pressure in the first vacuum chamber;
   wherein heating the fluid received from the first vacuum chamber while sealed in the second vacuum chamber comprises maintaining a second pressure in the second vacuum chamber;
   wherein heating the fluid received from the second vacuum chamber while sealed in the third vacuum chamber comprises maintaining a third pressure in the third vacuum chamber; and
   wherein the first pressure, the second pressure, and the third pressure are each below atmospheric pressure.

9. The method of claim 8, where the first pressure, the second pressure, and the third pressure are each about 1.05 pounds per square inch (psi).

10. The method of claim 1, where separating fuel oil from a fluid received from the first vacuum chamber comprises separating kerosene from the fluid received from the first vacuum chamber.

11. The method of claim 1, comprising viscbreaking the lubrication oil received from the third vacuum chamber by heating the lubrication oil from the third vacuum chamber while sealed in a fourth vacuum chamber to a fourth maximum specified temperature that is higher than the third maximum specified temperature to decrease a viscosity of the lubrication oil.

12. The method of claim 11, where the fourth maximum specified temperature is at or between 370 and 455° Celsius.

13. The method of claim 1, comprising removing sulfur from one of the lubrication oil received from the third vacuum chamber or the fluid received from the second vacuum chamber in a reactor.

14. A method comprising:
   (a) heating a fluid comprising waste fluid comprising lubrication oil in a vacuum in a vessel pressure-sealed by closing all inlet and outlet valves to and from the vessel to a maximum temperature less than a critical temperature of vaporization of the lubrication oil to separate a first component from the fluid; and
   (b) heating the remaining fluid from step (a) in a vacuum of a vessel pressure-sealed by closing all inlet and outlet valves to and from the vessel to a temperature above the critical temperature of vaporization of the lubrication oil, but not higher than the cracking temperature of the lubrication oil to separate the lubrication oil from the remaining fluid.

15. The method of claim 14, wherein the vessel in step (a) is a first pressure-sealed vessel, and wherein the vessel in step (b) is a second pressure-sealed vessel.

* * * * *